United States Patent [19]

Mizoshita et al.

[11] Patent Number: 4,720,754
[45] Date of Patent: Jan. 19, 1988

[54] DIGITALLY RESPONSIVE SYSTEM FOR POSITIONING A TRANSDUCER OF A STORAGE APPARATUS

[75] Inventors: Yoshifumi Mizoshita, Tama; Susumu Hasegawa, Kawasaki, both of Japan

[73] Assignee: Fujitsu Limited, Kanagawa, Japan

[21] Appl. No.: 678,852

[22] Filed: Dec. 6, 1984

[30] Foreign Application Priority Data

Dec. 8, 1983 [JP] Japan ................ 58-232406

[51] Int. Cl.$^4$ .................. G11B 5/596; G11B 21/10
[52] U.S. Cl. ................................................ 360/77
[58] Field of Search ................ 360/77, 78, 75, 44, 360/135, 79; 369/43, 44

[56] References Cited

U.S. PATENT DOCUMENTS

| | | | |
|---|---|---|---|
| 4,157,577 | 6/1979 | Porter, Jr. et al. | 360/77 |
| 4,322,760 | 3/1982 | Hardwick | 360/77 |
| 4,400,747 | 8/1983 | Siverling | 360/77 |
| 4,454,549 | 6/1984 | Pennington | 360/77 |
| 4,530,019 | 7/1985 | Penniman | 360/77 |
| 4,546,395 | 10/1985 | Sellars | 360/77 |

FOREIGN PATENT DOCUMENTS 2064830 6/1981 United Kingdom .

OTHER PUBLICATIONS

IBM TDB, vol. 23, No. 2, "Servo System for Magnetic Recording Based on Time Comparison", Gruss et al., 7/80, pp. 787–789.
Electronics International, vol. 56, No. 5, Mar. 10, 1983, pp. 139–142, New York, U.S.; L. Sarisky: "Refined Closed-Loop Servo Enhances Low-Cost Disk Drive's Accuracy".

*Primary Examiner*—Raymond F. Cardillo
*Assistant Examiner*—Steven R. Garland
*Attorney, Agent, or Firm*—Armstrong, Nikaido, Marmelstein & Kubovcik

[57] ABSTRACT

A servo system, for positioning a transducer of a rotatable storage apparatus over a servo tracks of a magnetic disc processes trains of positioning pulse signals. A reference voltage, changing with time, having a predetermined pattern, is generated and compared with a train of positioning pulse signals. The magnitude of the positioning signals, which varies with the displacement of the transducer from a guide path to be followed, the number of the positioning signals exceeding the reference voltage pattern is counted and an error signal for the servo system is determined as a function of the count and is fed back in a digital form.

5 Claims, 26 Drawing Figures

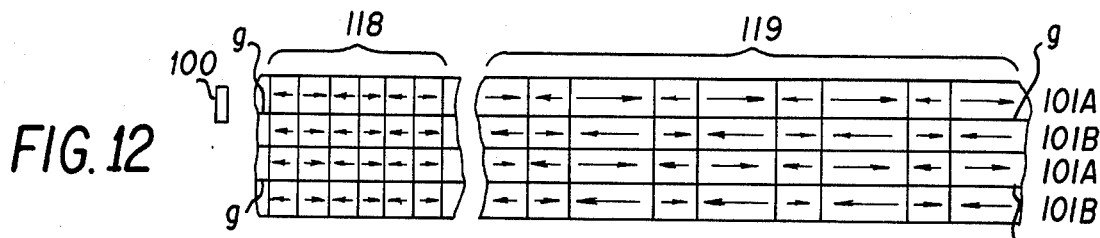
FIG. 12
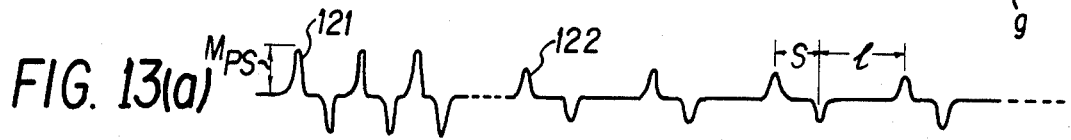
FIG. 13(a)
FIG. 13(b)
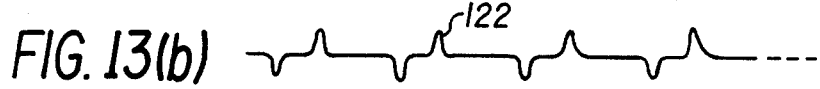

FIG. 23 (No Pulse Output) 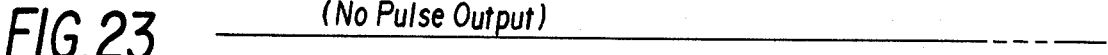

DIGITALLY RESPONSIVE SYSTEM FOR POSITIONING A TRANSDUCER OF A STORAGE APPARATUS

BACKGROUND OF THE INVENTION

1. Field of the Invention

This invention relates to an information recording and reproducing system for a data storage apparatus and more particularly to a positioning system for track location of a transducer. Still more particularly, it relates to a system for detecting the displacement of a transducer from a guide path which the transducer is to follow, by processing a train of positioning signals induced in the transducer by sensing magnetic transitions formed on servo-tracks.

2. Description of the Prior Art

A rotatable storage device, such as a magnetic disc storage, comprises a storage medium having a number of data tracks thereon, a transducer movable by an actuator over the data tracks from one transducing position to another, and a servo-system for providing the actuator with positioning signals. Since the use of transitions (magnetic flux reversals) was adopted, the field of the positioning servo-system has been increasingly extended and more accurate positioning of the transducer over the data tracks is required as the recording density on the magnetic disc has increased.

In a rotatable storage apparatus, a transducer is positioned over a guide path such as a borderline between two adjacent servo tracks. Each servo track has a series of magnetized domains arranged in series in the longitudinal (running) direction and has a magnetic orientation alternately in one direction and the opposite direction, forming magnetic transitions between two adjacent domains. Accordingly, the transducer gap, positioned over a running servo track, experiences a magnetic reversal each time a transition passes beneath the transducer gap and a series of pulses forming a pulse train, is induced in the transducer. The polarity and magnitude of the pulses depends upon the flux reversal thus induced. It should be noted that there is a group of transitions S having the same orientation formed on all tracks and aligned on the same radial of the disc which forms a continuous transition line. Therefore, at this point, a synchronizing pulse signal S having a fixed magnitude is induced regardless of the displacement of the transducer off its guide path. The pulse induced by the transition S is utilized as a clock pulse for the system.

At the other transitions for each servo track, positioning signals are induced in the transducer. The pulse magnitude of each signal is proportional to the width of a portion of the transducer which passes across the transition. As a result, the magnitude of each signal varies in proportion to the displacement of the transducer with respect to the guide path. Accordingly, the difference in the magnitude of two pulses, induced from two servo tracks adjacent to the guide path, can be utilized as positioning error information.

Positioning signals in a positioning system which had been generated with analog processing in the prior art systems had an inherent problem in that a complicated and expensive digital to analog convertor was required. However, recently, digital devices, such as digital large scale integrated circuits (LSI), have made a great improvement in high speed operation and high density packaging, and the operation is significantly faster than the prior analog devices. The use of such digital devices is favorable for high speed processing and miniaturization of the apparatus. Particularly, a great amount of software is applicable to construction of a system for a storage apparatus. Recently, a system providing digital positioning signals in pulse form to a servo system has been proposed. Such an approach is disclosed, for instance, in U.S. Pat. No. 4,157,577 entitled "Rotatable Storage Apparatus with Digitally Responsive Circuitry for Track Selection" issued in June, 1979, to Townsend H. Porter, Jr., et al.

The apparatus of this patent has a pair of groups consisting of different digital bytes, which are arranged in a stepwise pattern radially (perpendicular to the guide path, inside and outside of a guide path) on a magnetic disc. Error signals are obtained by detecting the number of bytes passing beneath the transducer. The number varies in proportion to the displacement of the transducer from the guide path. Thus the positioning error signals are fed to a servo system in a digital form. However, the configuration of the digital bytes is complicated and the number of steps in the signal is limited because of the limited space on the magnetic disc and the fabricating accuracy of the pattern, resulting in insufficient accuracy and a high fabricating cost of the device.

SUMMARY OF THE INVENTION

It is an object of the present invention to provide a improved system for detecting a positional displacement of a body, moving relatively with respect to another body, from a guide path to be followed, and correcting the displacement of the body.

It is another object to provide a rotatable storage apparatus with an improved system for detecting the displacement of a transducer from a guide path, the system processing trains of positioning signal pulses, obtained from magnetic transitions formed on a rotatable storage medium, without a digital/analog converting process.

It is still another object of this invention to provide a practically improved system for processing the positioning signal trains by comparing them with a predetermined reference voltage pattern which changes with time.

The present invention is directed to a servo positioning system having a servo track configuration and a processing system for positioning signals in which an improved technique is provided for processing digital positioning error signals for driving a servo means, without converting the signal pulse train into an analog signal. As stated above, two types of pulse signals are generated, one is a synchronizing signal of one polarity pulse (to be referred as a negative polarity pulse in the application) with a fixed (and largest) magnitude and a fixed interval, acting as a clock pulse, and the other one is a positioning pulse whose magnitude varies with the displacement of the transducer from the guide path. During one period, that is, between two adjacent clock pulses, plural positioning pulses are generated at a predetermined interval forming a pulse train. The positioning pulses are of a negative polarity or positive polarity and their magnitude is closely related to the displacement of the transducer from a guide path upon which the transducer is to be centered. Usually a boundary line between two adjacent servo tracks is selected as the guide path. The positioning signals are processed as described in the following.

The pulse signal train is sliced by comparing it with a reference voltage having a special pattern such as a sawtooth waveform, not an ordinary constant level pattern for slicing. The sawtooth waveform is formed in a signal generating circuit, which is synchronized with clock pulses generated by synchronizing transitions built into the servo tracks. After the slicing process, there are some remaining portions of each pulse signal which have a higher magnitude than the associated slicing level. The portions will be referred as a "residual" pulse in the following. The pulses with a magnitude lower than the associated slicing levels are entirely cut and eliminated. The number of residual pulse signals are then counted. This number is proportional to the magnitude of the positioning pulse signals, and is fed to a servo means, as a digital positioning signal, to drive the transducer back to the guide path.

Furthermore, the sensitivity of the positioning error signals can be adjusted by changing the slicing pattern. For example, in the case of the sawtooth voltage pattern for slicing, by changing the slope of the pattern, the number of the residual signal pulses obtained from a pulse train, is controlled so as to provide a desired sensitivity.

The advantage of such a positioning system described above, is that a costly analog-digital convertor is replaced by a slicing means, such as a signal generator and a comparator, simplifying the positioning information processing system and reducing the total cost of the storage apparatus.

Another advantage of the present invention is that a slicing means for the positioning pulse signals is simple and flexible for meeting various requirements of the positioning system, without the use of a complicated servo track configuration which can not be easily changed.

The details of construction and operation of the positioning system according to the present invention will be described as more fully hereinafter, with reference to the accompanying drawings.

BRIEF DESCRIPTION OF THE DRAWINGS

FIGS. 12 to 25 illustrate an another embodiment of the present invention.

FIG. 12 is a plan view illustrating the servo-track configuration.

FIGS. 13(a) and (b) are time charts illustrating signal patterns induced in a transducer.

FIGS. 14 to 24 are time charts for respective processing steps showing signal patterns.

FIG. 14 is a time chart showing a gate signal for a peak holder.

FIG. 15 is a time chart showing a held peak voltage of synchronizing signals.

FIG. 16 is a time chart showing a gate signal for a peak holder.

FIG. 17 is a time chart showing a reference voltage pattern for positive positioning signals.

FIG. 18 is a time chart showing a reference voltage pattern for negative positioning signals.

FIG. 19 is a time chart showing counting pulses representing the number of positive positioning signals exceeding the reference voltage shown in FIG. 17.

FIG. 20 is a time chart showing counting pulses representing the number of negative positioning signals exceeding the reference voltage shown in FIG. 17.

FIG. 21 is a time chart showing gate signals initiated by the fall of the counting pulses shown in FIG. 19.

FIG. 22 is a time chart showing gate signals initiated by the fall of the counting pulses shown in FIG. 20.

FIG. 23 is a time chart showing the signals in an up-counter.

FIG. 24 is a time chart showing the signals in a down-counter.

FIG. 25 is a block diagram of a circuit for processing positioning signals obtained from servo-tracks.

DESCRIPTION OF THE PREFERRED EMBODIMENTS

Figure 1:
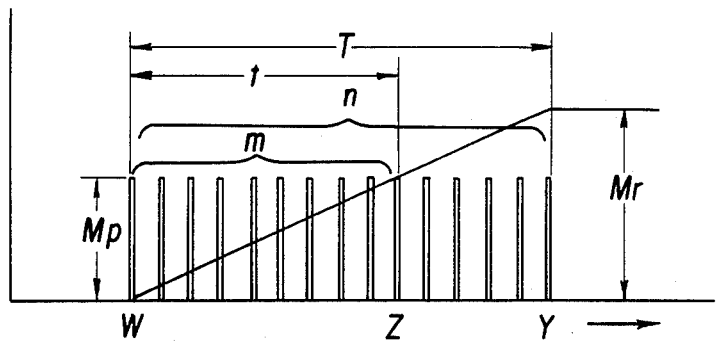
FIG. 1 is a time chart illustrating the principle of a measuring method according to the present invention, by the use of a reference voltage pattern and a train of signal pulses.
Figure 2:
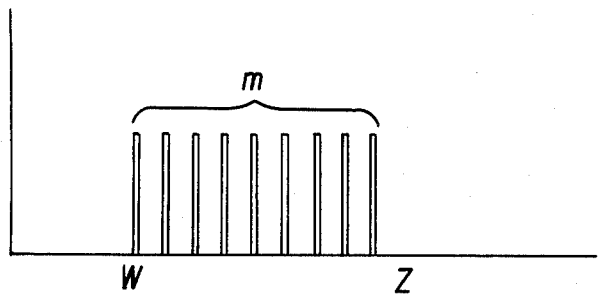
FIG. 2 is the time chart illustrated in FIG. 1, showing the signal pattern after slicing.

Before proceeding with the description of the embodiments of the present invention, the principle of measurement adopted in the present invention is discussed with reference to FIGS. 1 and 2. As shown in the time chart of FIG. 1, the magnitude of a pulse train to be measured is $M_p$. The train of signal pulses is superimposed with a reference voltage having a sawtooth pattern, which is formed in a time interval T, referred to hereinafter as a "period". The period starts at the time point W and ends at the time point Y, and the pulse train and the reference voltage intersect each other at time point Z having a time interval t from the time point W. Obviously, by counting the number of pulses n contained in a period T and the number m contained in the time length t, the magnitude $M_p$ of the pulses can be represented by $$M_p = M_r m/n \quad (1)$$

as long as the pulses comprising the train maintain a fixed pitch. FIG. 2 illustrates the remaining positioning signal pulse train after slicing. The remaining pulses are shaped to normal pulses and counted. Alternatively, instead of counting the number of remaining positioning signals, the magnitude $M_p$ can be determined by measuring the time length t of the train of remaining positioning signals and comparing the period T following the equation.

$$M_p = M_r \cdot t/T \tag{2}$$

Figure 3:
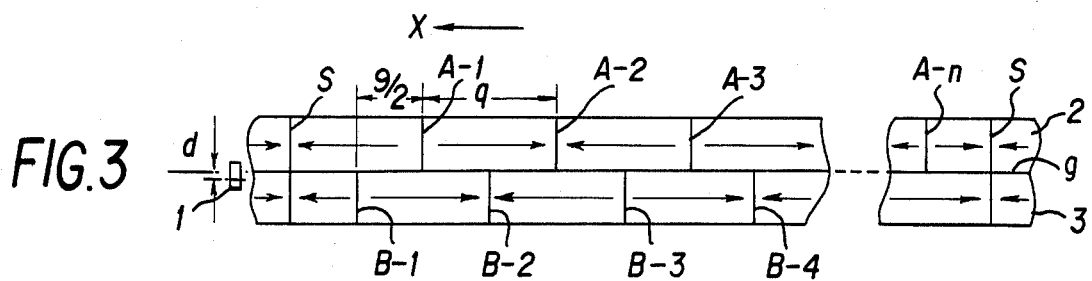
FIG. 3 is a schematic plan view illustrating the configuration of a servo track, including transitions formed thereon, which is used in an embodiment of the present invention.
Figure 4:
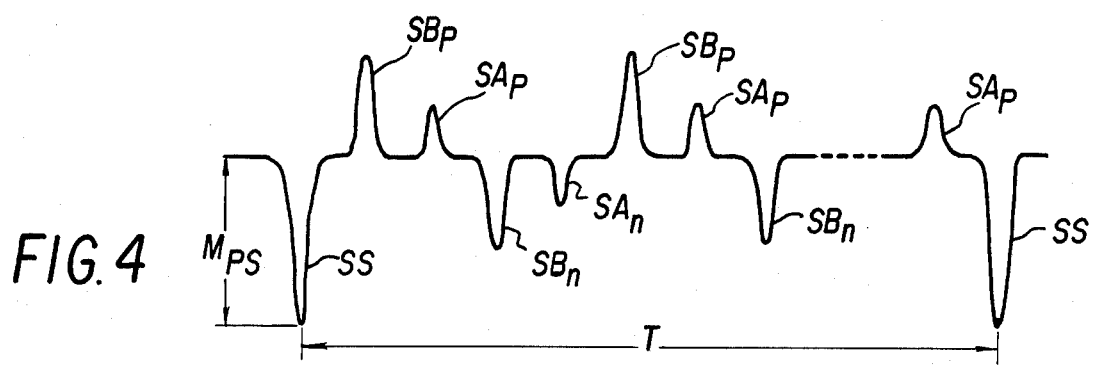
FIG. 4 is a time chart illustrating synchronizing pulses and positioning pulse signal trains detected through a transducer from the servo tracks shown in FIG. 3.

An embodiment using the above principle will be disclosed with reference to FIGS. 3 through 11. In FIG. 3, the servo track configuration according to the present invention is illustrated. Although the tracks are shown in a straight configuration for convenience, the actual tracks are formed in a concentric circular configuration. All synchronizing transitions S, which are negative transitions, occur at the same position on all servo tracks. They are aligned from one track to next track providing a continuous transition of the same polarity radially across the disc. The other transitions, positioning transitions, of positive or negative polarity, should occur at different positions. In the servo tracks 2 and 3, it is seen that a series of n positioning transitions A-1, A-2, A-3, . . . , A-n is formed in the odd servo track 2 having alternate positive or negative polarity and another similar series of n positioning transitions B-1, B-2, B-3, . . . , B-n is formed in the even servo track 3. The transitions belonging to both series have a fixed pitch q, and the transitions A-1, A-2, etc. have an offset with respect to the other corresponding transitions B-1, B-2, etc. by a half pitch q/2. The arrows in the figure symbolize the orientation of the magnetized domains bordered by a pair of transitions. In the following description, as shown in FIG. 3, it is assumed that the center of a transducer 1 is displaced from a guide path (denoted by g in the figure), namely, the border line between the servo tracks 2 and 3, toward the track 3. It is assumed that the displacement d is equal to, for instance, one sixth of the width of transducer 1. When the servo tracks are driven towards the left as indicated by an arrow X in the figure, positive pulse signals SAp or negative signals SAn are induced alternately in the transducer 1 as shown in FIG. 4.

Synchronizing negative pulses, clock pulses SS, having a fixed magnitude $M_{ps}$, are produced at fixed time intervals T. The magnitude $M_{ps}$ is the largest because the pulse current is induced from the continuous transitions S through the entire width t of the transducer 1. On the contrary, a pulse train of positioning signals SAp and SAn induced alternately by positioning transitions A-1, A-2, A-3, . . . on the track 2 respectively, have a magnitude of one third of that of $M_{ps}$ because of portion of one third of the entire width of the transducer 1 pass over the transitions. For the same reason, another pulse train B of positioning signals SBp and SBn has a magnitude of two thirds of the magnitude $M_{ps}$ of synchronizing pulse SS.

Obviously the sum of the absolute values of the amplitudes of a pulse SA and a pulse SB should be a fixed value of $M_{ps}$. Therefore, when the transducer 1 is centered on the guide path, namely d=0, the positioning pulses belonging to both pulse trains SA and SB have the same magnitude of $M_{ps}/2$. When there is a displacement d of the center of the transducer from the guide path, the difference between the absolute values of (SBp-SAp) or (SBn-SAn) is proportional to twice the displacement, 2d. According to the present invention, the pulse amplitudes are measured by a digital processing method as follows.

Figure 5:
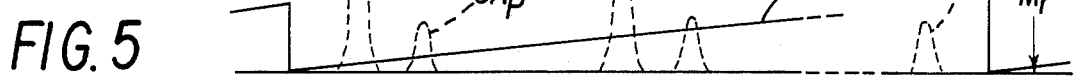
FIG. 5 is a time chart illustrating a reference voltage pattern for slicing the positioning pulse train.
Figure 6:
FIG. 6 is a time chart illustrating a counting pulse obtained by comparing the positioning pulse signal trains of one polarity with the slicing voltage using a comparator.

A reference voltage SV, having a positive sawtooth pattern, is generated repeatedly, triggered by every clock pulse SS and terminated at the next clock pulse as shown in FIG. 5. The height of the sawtooth pattern, $M_r$ has a fixed value of $M_{ps}$. The positioning pulses are shown in dotted lines in the figure at respective time positions, which are sliced electrically by comparing with the sawtooth reference voltage SV using a comparator. As a result, the positive positioning signals which have magnitude higher than the corresponding reference voltage remain, and positive positioning signals having a magnitude lower than corresponding reference voltage are entirely sliced and eliminated. The residual positioning pulses are outputted in the form of count pulses from the comparator, as shown in FIG. 6. It is easily known by equation (1), referring to FIG. 5, that the magnitude of the positioning pulse is equal to $M_{ps} \times 2m/n$, wherein m is the number of count pulses, by considering that the total number of the positive positioning pulses per period T is equal to n/2. Therefore, the number m of count pulses SP after slicing is proportional to the magnitude of the positioning signal. Thus, ultimately, the magnitude of the signal train SA is represented digitally. In the same way, the magnitude of the other pulse train SB can be represented by the number of its residual pulses after slicing. Accordingly, digital positioning error information corresponding to the value of displacement d is obtained by calculating the difference of the number of the count pulses SP corresponding to each pulse trains SA and SB.

Figure 7:
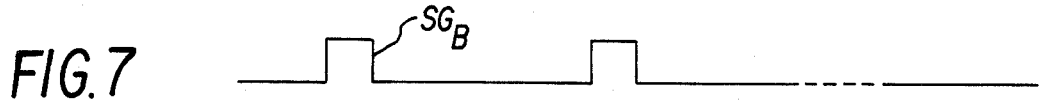
FIGS. 7 and 8 are time charts illustrating gate pulses for separating count pulses shown in FIG. 6 into two trains.
Figure 8:
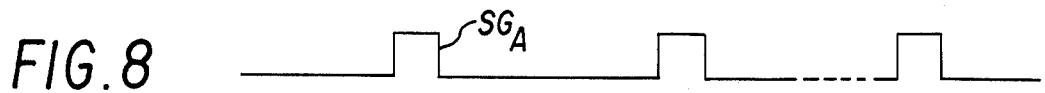
Figure 9:
FIGS. 9 and 10 are time charts illustrating the separated count pulse trains respectively.

The count pulses SP corresponding to positive positioning signals $SA_p$ and $SB_p$ are separated by the aid of gate signals SGA and SGB which are generated in gate circuits corresponding to the positioning signal $SA_p$ and $SB_p$ respectively as shown in FIG. 8 and FIG. 7. Thus the count pulses are windowed by the gate signals and separated as shown in FIG. 9 (denoted as SU) for positioning signals $SB_p$ and in FIG. 10 (denoted as SD) for positioning signals $SA_p$. In this case, the magnitude of the positioning signal SB is larger than that of the signal SA, providing a larger number of count pulses SU than that of count pulses SD. The difference in the numbers is fed back to the servo system of the actuator of the magnetic head as digital positioning error information.

In the embodiment described above, the positive positioning signals are used, but the negative positioning signals are also applicable in the same way. Furthermore, by reversing the polarity of the negative positioning signals, both positive and negative positioning signals can be used to obtain more precise error signals with an approximately doubled accuracy. A greater number of transitions n provides a more precise accuracy for positioning the actuator of the magnetic head. With a currently used apparatus by the present invention, the number n of transitions is up to approximately 100 to 300, which provides a substantially higher accuracy than that of prior art apparatus.

Figure 11:
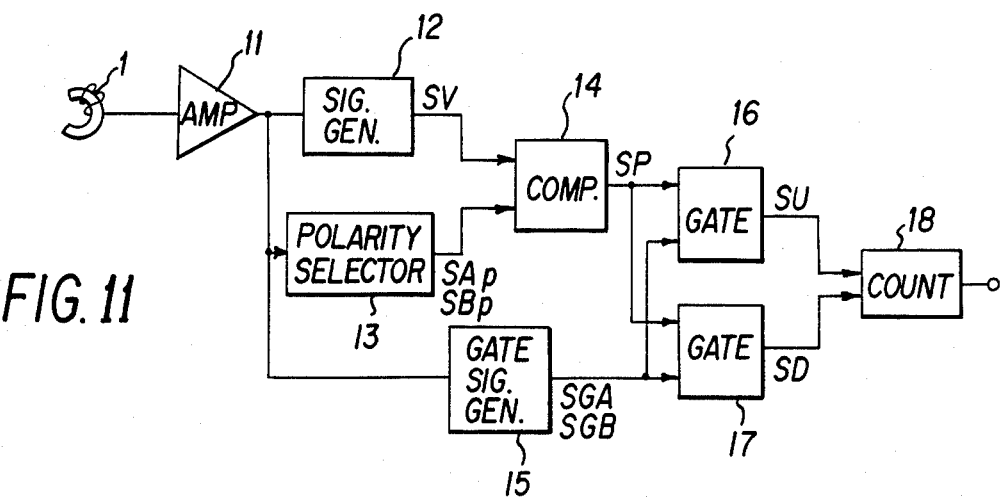
FIG. 11 is a block diagram illustrating a processing system for a positioning pulse train used in an embodiment of the present invention.
Figure 10:
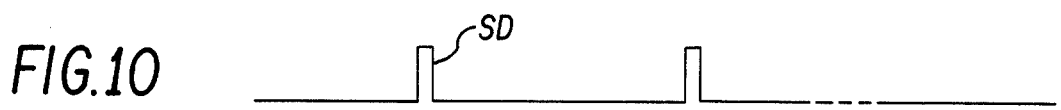

FIG. 11 is a block diagram of a circuit for processing the servo signals shown in FIG. 5 detected from magnetic transitions formed in servo tracks. The servo signals detected by the transducer 1 are amplified by an pre-amplifier 11, whose output waveform is shown in FIG. 4. The reference voltage SV of a sawtooth pattern shown in FIG. 5, is generated by a signal generator 12, synchronized by the clock pulse SS detected from the synchronizing transitions S in the servo tracks. A polarity selector 13 selects only the positive positioning signals $SA_p$ and $SB_p$, for instance, and feeds the selected signals to a comparator 14, where the positive positioning signals are compared to the sawtooth formed reference voltage and sliced. The residual signals are converted to count pulses SP within the comparator 14, as shown in FIG. 6. The gate signals SGA and SGB shown in FIGS. 7 and 6 are generated in a gate signal generator 15 respectively, being triggered by respective positioning signals $SA_p$ and $SB_p$ fed from the pre-amplifier 11. The gate signals SGA and count pulses SP are fed to a gate circuit 17, where a pulse signal train SD, shown in FIG. 10, is fed to an up-down counter 18. Similarly, the gate signals SGB and count pulses SP are fed to a gate circuit 16 and the output count pulses SU, shown in FIG. 9, are fed to the up-down counter 18. The difference between the number mu of count pulses SU and the number md of count pulses SD, mu-md, is fed to a servo system (not shown) as a digital positioning error signal.

So far, the processing system handling positive positioning signals only has been described. But it will be apparent to those skilled in the art that by adding another set of system components comprising a slicing pattern generator, gate circuits, or other means such as a polarity reversing circuit, the negative positioning signals, SAn and SBn, can additionally be utilized to improve the preciseness of the system by almost double.

Further, a second embodiment of this invention will be disclosed. FIG. 12 illustrates two pairs of another servo-track configuration. It differs from the configuration shown in FIG. 3 in the alignment of positioning transitions and the distance between transitions. The servo-tracks 101, each consisting of an odd track 101A and an even track 101B, include synchronizing regions 118 and positioning regions 119. All pairs of transitions are arranged in alignment on radials of the disc. The polarity of the transitions aligned on a radial for the synchronizing region 118 is the same, and the polarity of the positioning signal region 119 changes alternately from an odd track to the adjacent even track and vice versa. Furthermore, the positioning signals are alternately short and long. This is for identifying the direction of the displacement of the transducer from the guide path g as described later.

Figure 14:
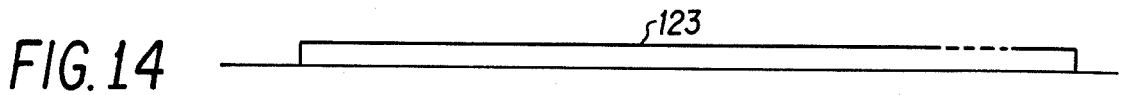
Figure 15:
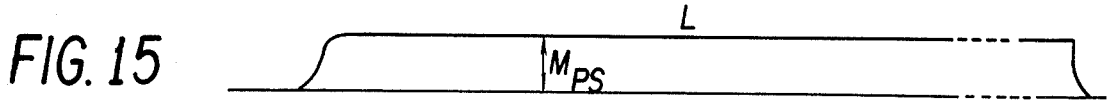
Figure 16:
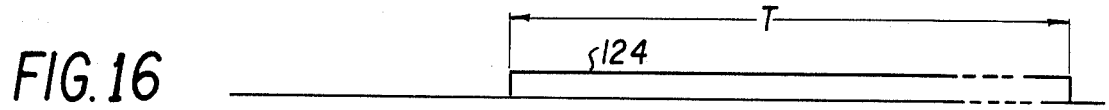
Figure 17:
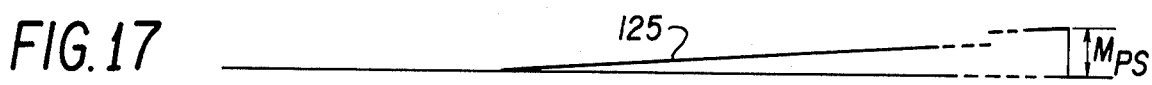
Figure 18:
Figure 19:
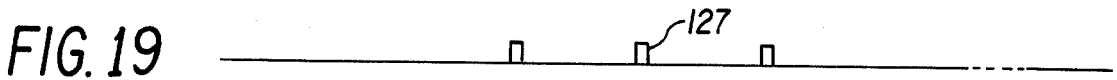
Figure 20:
Figure 25:
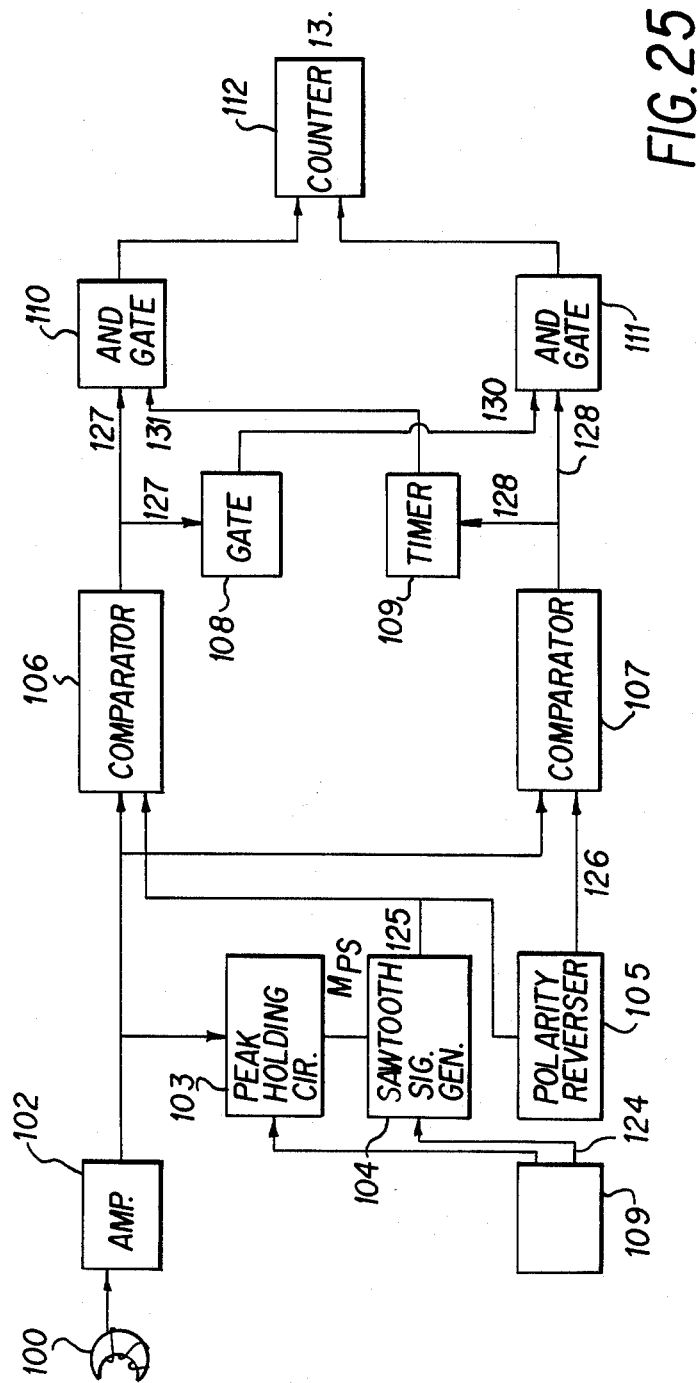

Referring to FIG. 25, signal voltages induced in a transducer 100 from the transitions are amplified by a pre-amplifier 102. As shown in the time chart of FIG. 13(a), the magnitude of pulse signals 121 induced by synchronizing transitions is always a fixed value $M_{ps}$ regardless the displacement of the transducer 100. When the transducer 100 is centered on the guide path g, a boundary between odd and even tracks 101A and 101B, the induced current by a pair of transitions in the positioning region 119, located on adjacent tracks 101A and 101B is zero because the two components of the induced current in the transducer 100 have opposite polarities and the same magnitude and thus cancel each other. When the transducer 100 is displaced from the guide path g, upward in the figure, for instance, positioning signals 122 appear as the difference of the current magnitude induced by the transitions on tracks 101A and 101B. Accordingly, the magnitude of the positioning signals is proportional to the displacement. In this case, a short interval s between signals is followed by a long interval 1 alternately forming pairs of the two signals. It should be noted, in this case as shown in FIG. 13(a), that, with a pair of two signals, a positive signal comes first followed by a negative one with a time distance s. A peak-holding circuit 103 is opened by a gate (included in a timer 109) which is controlled by the timer 109 as shown in FIG. 14. The peak holding circuit 103 holds the peak voltage $M_{ps}$ as shown in FIG. 15, which is fed to the sawtooth signal generator 104, providing the reference voltage pattern with a peak magnitude of $M_{ps}$. The gate pulse 124 shown in FIG. 16 is provided by the timer 109 to the signal generator 104, which generates a sawtooth formed reference voltage pattern 125 as shown in FIG. 17. It has a positive polarity and a duration time T. The reference voltage is fed directly to a comparator 106 and a polarity reverser 105 where it is reversed to negative reference voltage 126 as shown in FIG. 18, which is fed to another comparator 107. The positive positioning signals 122 are fed to the comparator 106 and the negative positioning signals are fed to the comparator 107, where they are compared with the sawtooth reference voltages 125 and 126 respectively, depending upon the polarities. The number of positioning signals whose magnitude is greater than the reference voltage are counted in both comparator 106 and 107 and are outputted as counting pulses 127 and 128 as shown in FIG. 19 for the positive positioning signals and in FIG. 20 for the negative positioning signals. The magnitude of the positioning signal, namely, the displacement of the transducer 100 can be represented by the number of the counting pulses 127 or 128.

Figure 21:
Figure 22:
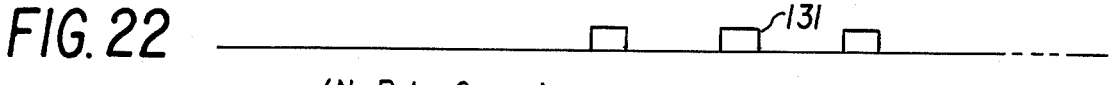
Figure 24:
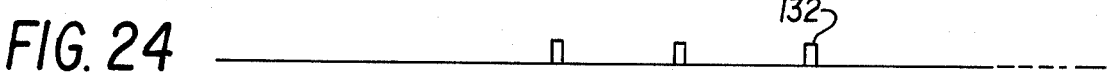

Now, the direction of the displacement of the transducer 100 is detected. The counting pulses 127 are fed to an AND circuit 110 and a gate circuit 108. A gate signal 130 is generated by a gate circuit 108, being triggered by the fall of the counting pulse 127 and is fed to an AND circuit 111 as shown in FIG. 23. The counting pulses 128 are also processed in the similar manner by an AND circuit 111 and gate circuit 109. As a result, as can be seen from FIGS. 19, 21 and 22, the counting pulse 127 can not pass the gates and are not outputted from the up-counter of a up-down counter 112 as shown in FIG. 23. Only the counting pulses 128 are outputted, as shown in FIG. 24, from the down counter of the up-down counter 112, which represents that the transducer 100 is displaced in the upward direction in FIG. 12.

When the transducer 100 is displaced from the guide path g in the downward direction in FIG. 12, the positioning signals are generated as shown in FIG. 13(b). With regard to the pair of positioning signals 122, the negative signal comes first. It can be easily understood that the positioning signals will be outputted from the up-counter of the up-down counter 112 in the same way as described above. Thus, complete error information to be fedback to the servo-system for the transducer 100 is obtained.

The present invention is also applicable for other systems such as a control system for an automatic transportation vehicle used in a machine shop , for instance, a positioning system for a tool holder of an automatic profile machine and the like.

Although there might be various varieties of servo-track configurations and systems for processing the positioning signals, it can be understood for those skilled in the art that the processing technique for the positioning signals utilizing a reference voltage pattern changing with time is a substantial advantage of the present invention because of its simplicity and flexibility in detecting the magnitude and direction of the displacement of the transducer.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A system for detecting a displacement of a first body away from a predetermined data track formed on a second body moving relatively to said first body, for guiding said first body along said data track said second body including a plurality of data tracks for storing data and a plurality of servo tracks parallel to corresponding data tracks, said system comprising:

a plurality of code members stored in each of said servo tracks;

a positioning transducer means fixed to said first body, for sensing positional signals from said code members and generating a positioning pulse train corresponding to the relative movement of said first and second bodies;

a signal generator means for generating a reference voltage changing with time, said reference voltage having a predetermined pattern within a given time period T;

a comparing means for comparing the height of each pulse in said positioning pulse train to said reference voltage; and a processing means for counting the number m of positioning pulses from said positioning pulse train which exceed said reference voltage and processing said counted number of positioning pulses to provide a signal corresponding to the displacement of said first body from said data track.

2. The system of claim 1, wherein said second body is a magnetic disc including said data tracks for magnetically storing information, and said first body includes a magnetic head for sensing said information magnetically stored in said data track.

3. The system of claim 1, wherein the second body is a magnetic tape including said data tracks for magnetically storing information, and said firsst body includes a magnetic head for sensing said information magnetically stored in said data tracks.

4. The system of claim 1, wherein each of said servo tracks includes two rows of magnetic recording material, and each of said code members comprises two rows of magnetized domains provided in said rows of magnetic recording material, the magnetic orientation of said magnetized domains changing alternately from one direction to an opposite direction to said one direction, thereby forming a train of transition lines having alternately changing polarities, said transition lines on both rows being displaced from each other a predetermined distance, but being aligned on a line at beginning and end portion of each code member.

5. The system of claim 1, wherein each of said servo tracks includes two rows of magnetic recording material, and each of said code members comprises two rows of magnetized domains provided in said rows of magnetic recording material, the magnetic orientation of said magnetized domains changing alternately from one direction to an opposite direction to said one direction, thereby forming a train of transition lines having alternately changing polarities;

said transition lines on both rows being aligned to each other on a line and magnetized domains on both rows have an opposite magnetic orientation with respect to one another in a first portion of each code member; and the length of magnetized zones of said transition lines being varied alternately from one to the next and the magnetization direction of neighboring rows being anti parallel to each other in the first portion; and a second portion of each code member in which the length of said magnetized zones are equal to each other and the magnetization direction is paralledl between the rows.

* * * * *